United States Patent
Pedlow et al.

(10) Patent No.: US 9,160,720 B2
(45) Date of Patent: *Oct. 13, 2015

(54) DIGITAL RIGHTS MANAGEMENT OF STREAMING CONTENTS AND SERVICES

(71) Applicants: Sony Corporation, Tokyo (JP); SONY NETWORK ENTERTAINMENT INTERNATIONAL LLC, Los Angeles, CA (US)

(72) Inventors: Leo Pedlow, Ramona, CA (US); True Xiong, San Diego, CA (US); Eric Holcomb, San Marcos, CA (US); Kathy Fielder, Oceanside, CA (US)

(73) Assignees: SONY CORPORATION, Tokyo (JP); SONY NETWORK ENTERTAINMENT INTERNATIONAL LLC, Los Angeles ( * ) Notice: Subject to any disclaimer, the term of this patent is extended or adjusted under 35 U.S.C. 154(b) by 0 days.

This patent is subject to a terminal disclaimer.

(21) Appl. No.: 14/189,914

(22) Filed: Feb. 25, 2014

(65) Prior Publication Data

US 2014/0181525 A1    Jun. 26, 2014

Related U.S. Application Data

(63) Continuation of application No. 13/312,184, filed on Dec. 6, 2011, now Pat. No. 8,661,255.

(51) Int. Cl.
*H04L 9/32* (2006.01)
*H04L 29/06* (2006.01)

(52) U.S. Cl.
CPC ........ *H04L 63/0428* (2013.01); *H04L 63/0435* (2013.01); *H04L 65/4084* (2013.01); *H04L 63/0823* (2013.01); *H04L 2463/101* (2013.01)

(58) Field of Classification Search
CPC ... H04L 63/04; H04L 63/0823; H04L 9/3236; H04L 63/0428; H04L 63/0435; H04L 2463/101; H04L 65/4084; G06F 21/33
USPC ..................... 713/168, 189; 726/7, 26; 705/50
See application file for complete search history.

(56) References Cited

U.S. PATENT DOCUMENTS 8,074,290 B2 * 12/2011 Nakano et al. ................... 726/33
8,196,194 B2 *  6/2012 Lindholm et al. ............... 726/14
(Continued)

FOREIGN PATENT DOCUMENTS

CN           101006428 A        7/2007

OTHER PUBLICATIONS

Kravitz et al., "Achieving Media Portability through Local Content Translation and End-to-End Rights Management", Nov. 2005, ACM, pp. 27-36.*

(Continued)

*Primary Examiner* — Matthew Smithers
(74) *Attorney, Agent, or Firm* — Procopio, Cory, Hargreaves & Savitch, LLP (57) ABSTRACT

Managing digital rights of contents and services streamed to a client device, including: receiving and validating a certificate from the client device; enabling the client device to log into and communicate with a server using a secure protocol to establish a private relationship between the client device and the server; and transmitting a resource identifier to the client device using the secure protocol when the private relationship is established.

20 Claims, 5 Drawing Sheets

(56) References Cited

U.S. PATENT DOCUMENTS

| | | | |
|---|---|---|---|
| 8,402,555 B2* | 3/2013 | Grecia | 726/29 |
| 8,533,860 B1* | 9/2013 | Grecia | 726/29 |
| 8,543,660 B2* | 9/2013 | Roberts et al. | 709/217 |
| 8,549,300 B1* | 10/2013 | Kumar et al. | 713/175 |
| 2003/0097564 A1 | 5/2003 | Tewari et al. | |
| 2003/0217267 A1* | 11/2003 | Kindberg | 713/168 |
| 2005/0066353 A1* | 3/2005 | Fransdonk | 725/29 |
| 2005/0091507 A1* | 4/2005 | Lee et al. | 713/182 |
| 2009/0304009 A1 | 12/2009 | Kolhi et al. | |
| 2010/0034389 A1 | 2/2010 | Sakharov | |
| 2010/0257363 A1* | 10/2010 | Kiran et al. | 713/169 |
| 2011/0016119 A1 | 1/2011 | Kodialam et al. | |
| 2011/0099382 A1 | 4/2011 | Grecia | |
| 2011/0119738 A1* | 5/2011 | Piepenbrink et al. | 726/4 |
| 2011/0231660 A1* | 9/2011 | Kanungo | 713/168 |
| 2012/0042160 A1* | 2/2012 | Nakhjiri et al. | 713/151 |
| 2012/0102317 A1* | 4/2012 | Mathur et al. | 713/156 |
| 2012/0102329 A1* | 4/2012 | Mittal et al. | 713/176 |
| 2012/0180109 A1* | 7/2012 | Chen | 726/3 |

OTHER PUBLICATIONS

Ramirez, "IPTV Security: Protecting High-Value Digital Contents," 2008, John Wiley & Sons Ltd., Chichester, England, 255 pages.

Third Party Submission Under 37 CFR 1.290 with Concise Description of Relevance and Evidence of Publication filed in U.S. Appl. No. 13/312,184 on Oct. 28, 2013, 4 pgs.

Grecia, William, Published by FedEx Kinkos printing services on Nov. 1, 2011, 2 pages.

Kravitz, David W. et al., "Achieving Media Portability through Local Content Translation and End-to-End Rights Management", Nov. 2005, ACM, pp. 27-36.

* cited by examiner

DIGITAL RIGHTS MANAGEMENT OF STREAMING CONTENTS AND SERVICES

CROSS-REFERENCE TO RELATED APPLICATIONS

The present application is a continuation application of co-pending U.S. patent application Ser. No. 13/312,184, filed Dec. 6, 2011. The disclosure of the above-referenced application is incorporated herein by reference.

BACKGROUND

1. Field of the Invention

The present invention relates to managing digital rights, and more specifically, to managing digital rights of streaming contents and services.

2. Background

The Internet as a global network for delivery of audio and video content is increasing in popularity which creates both opportunities and challenges to content and service providers. Since it is a global network, it offers the opportunity to deliver content to a worldwide customer base. However, because it is an open network, it also presents challenges with regard to protecting content from unauthorized use and distribution.

SUMMARY

The present invention provides for managing digital rights of streaming contents and services.

In one implementation, a method of managing digital rights of contents and services streamed to a client device is disclosed. The method includes: receiving and validating a certificate from the client device; enabling the client device to log into and communicate with a server using a secure protocol to establish a private relationship between the client device and the server; and transmitting a resource identifier to the client device using the secure protocol when the private relationship is established.

In a further implementation, the above method further includes receiving an encryption key (which can be generated and updated according to a schedule or manually from time to time) from a service provider; generating a hash value and a private key associated with the encryption key; encrypting the resource identifier using the encryption key and the hash value; and encrypting the hash value using the private key.

In another implementation, a digital rights management system for streaming contents and services to a client device is disclosed. The system includes: a registration unit configured to receive a certificate from the client device, wherein the registration unit enables the client device to log into and communicate with a server using a secure protocol when the certificate is validated, and wherein the validation of the certificate establishes a private relationship between the client device and the server; and an interface unit configured to transmit a resource identifier to the client device using the secure protocol when the private relationship is established.

In another implementation, a non-transitory storage medium storing a computer program to manage digital rights of contents and services streamed to a client device is disclosed. The computer program includes executable instructions that cause a computer to: receive and validate a certificate from the client device; enable the client device to log into and communicate with a server using a secure protocol to establish a private relationship between the client device and the server; and transmit a resource identifier to the client device using the secure protocol when the private relationship is established.

Other features and advantages of the present invention will become more readily apparent to those of ordinary skill in the art after reviewing the following detailed description and accompanying drawings.

DETAILED DESCRIPTION

In view of the opportunities and challenges to the content and service providers for delivery of audio and video contents, the content and service providers need to identify the right technology for secure delivery of both streaming and on-demand contents to the end-users. In one implementation, streaming contents and services include live or real-time streaming over the Internet. In another implementation, streaming contents and services include live or real-time over the air broadcast. In yet another implementation, the contents and services include image contents in addition to the audio and video contents. Such technology should address multiple digital rights management issues, such as secure content distribution, copy protection, and control of content expiration and content play limitation.

Certain implementations as described herein provide for digital rights management of resources such as servers, services, and contents by hiding resource identifiers (e.g., Uniform Resource Identifier (URI)) and refreshing them along with corresponding encryption keys. The resource identifiers are hidden and refreshed within secure protocols such as Secure Sockets Layer (SSL) or Transport Layer Security (TLS) so that no information about the resource identifiers is exposed. In other implementations, the resource identifier can be configured as an expirable resource identifier including an expiration date. The expirable resource identifier will expire and become invalid after a configurable period of time. When a server creates this resource identifier to be given to a client, it will use encryption and hash key which will make it hard for unintended users to break the resource identifier apart and overcome the expiry component of the resource identifier. Further, the infrastructure of an existing server-client relationship is used for robust security.

After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

The services and contents can be streamed to client devices at home, concert venues, sporting events, movies, conferences, or other similar settings, but currently there is no streaming system which addresses the issue of digital rights management. In one implementation, a digital rights management system manages resources such as servers, services, and contents by hiding resource identifiers such as Uniform Resource Identifier (URI), which can include Uniform Resource Name (URN) and/or Uniform Resource Locator (URL). Moreover, the management of resources can be easily enabled and secured by configuring the digital rights management system within the infrastructure of an existing private relationship such as a server-client relationship. The existing private relationship between a client device and a server provides the ability for the client device to validate itself using a secure protocol by presenting a valid certificate to the server. Once the client device is authenticated by the server, and a request is received by the server, the client device is presented with resource identifier(s) within the secure protocol so that the resource identifier(s) remains hidden from unauthorized parties. Thus, in this implementation, the digital rights management system can securely provide access entitlement to the resources for selected parties while preventing unauthorized parties from gaining useful access.

Figure 1A:
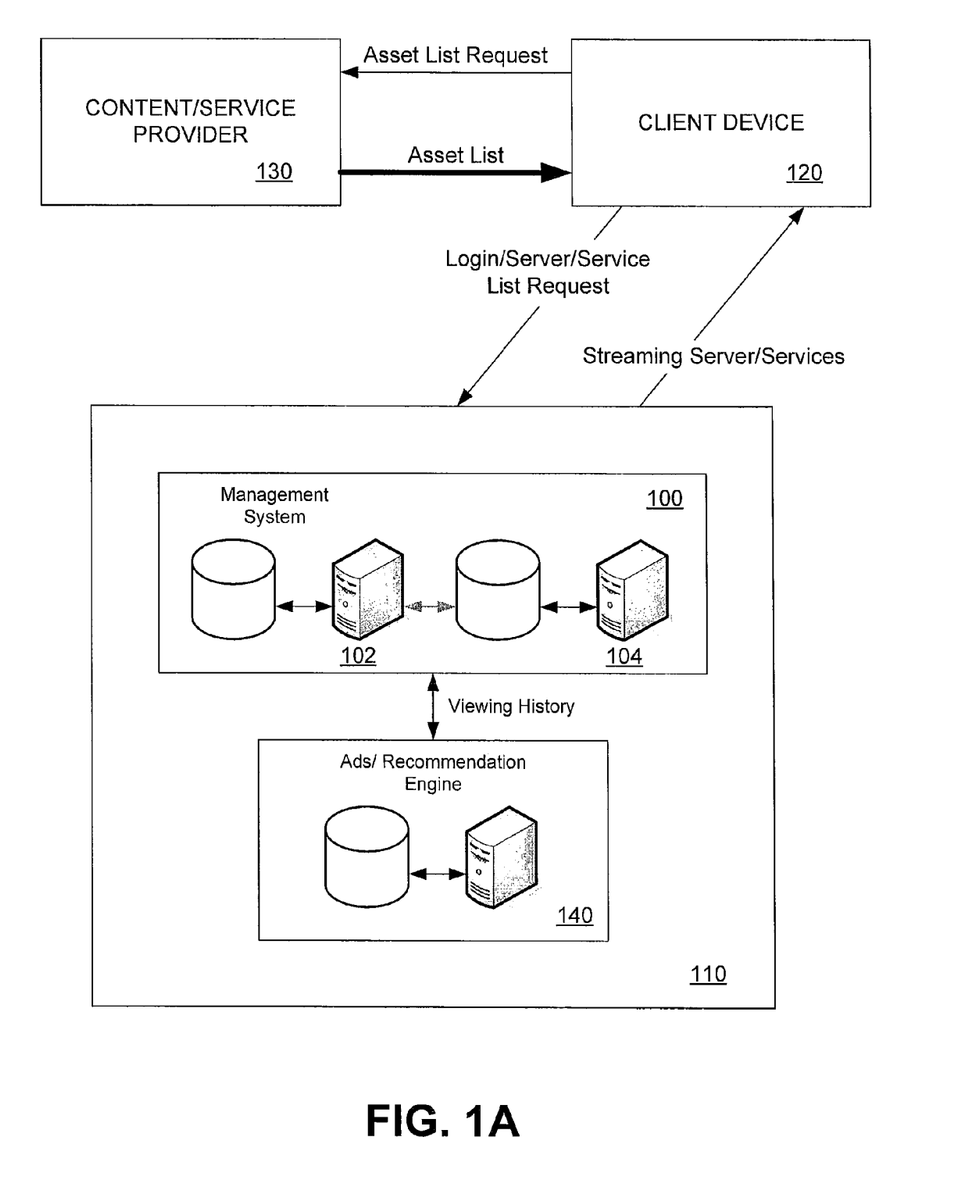
FIG. 1A shows a digital rights management system residing within a server and communicating with a client device in accordance with one implementation of the present invention.

In one example, shown in FIG. 1A, a digital rights management system 100 resides within a server 110 and communicates with a client device 120. When the client device 120 (e.g., an Internet Protocol TV (IPTV) client) requests a server list, the digital rights management system 100 checks for a valid certificate from the client device. The certificate is validated by a registration unit 102 of the digital rights management system 100 which enables the client device 120 to log into and communicate with the server 110 using a secure protocol (e.g., SSL or TLS). In one implementation in which the client device 120 is an IPTV client, validating the certificate further includes checking a registered television identifier and/or other server-specific certificates with values stored in the server 110. Thus, the client device 120 already has an existing private relationship with the server 110. In one example, the server 110 can be configured as a Bravia Internet Video Link (BIVL) system which provides video streaming and on-demand services accessible through a client device (e.g., home appliances such as a television).

In one implementation, once the client device 120 is authenticated through the use of a valid certificate, an interface unit 104 in the digital rights management system 100 transmits resource identifier(s) to the client device using a secure protocol such as HyperText Transfer Protocol Secure (HTTPS), which combines HTTP with an SSL/TLS protocol. In one example, the resource identifier(s) identifies resources residing on a content/service provider 130. In another example, the resource identifier(s) identifies resources residing on the server 110 or cloud storage (not shown). Since these interactions are performed within secure network(s) using a secure protocol, no information about the resource identifier(s) is exposed to the public.

In the illustrated implementation of FIG. 1A, the server 110 further includes an advertisement and/or recommendation engine 140. This engine 140 can personalize the advertisement and/or recommendation for other contents or services based on the type of contents or services being streamed and the preferences of the viewer identified by the certificate of the client device 120.

The client device 120 may request the content/service provider 130 for its services also using a secure certificate that is valid for communication with the content/service provider 130 over a secure protocol. In the illustrated implementation of FIG. 1A, the client device 120 requests for an asset list from the content/service provider 130 by presenting a valid certificate to the server. If the content/service provider 130 verifies that a valid certificate issued by the server 110 has been received from the client device 120, the content/service provider 130 provides the client device with a requested list of assets.

Figure 1B:
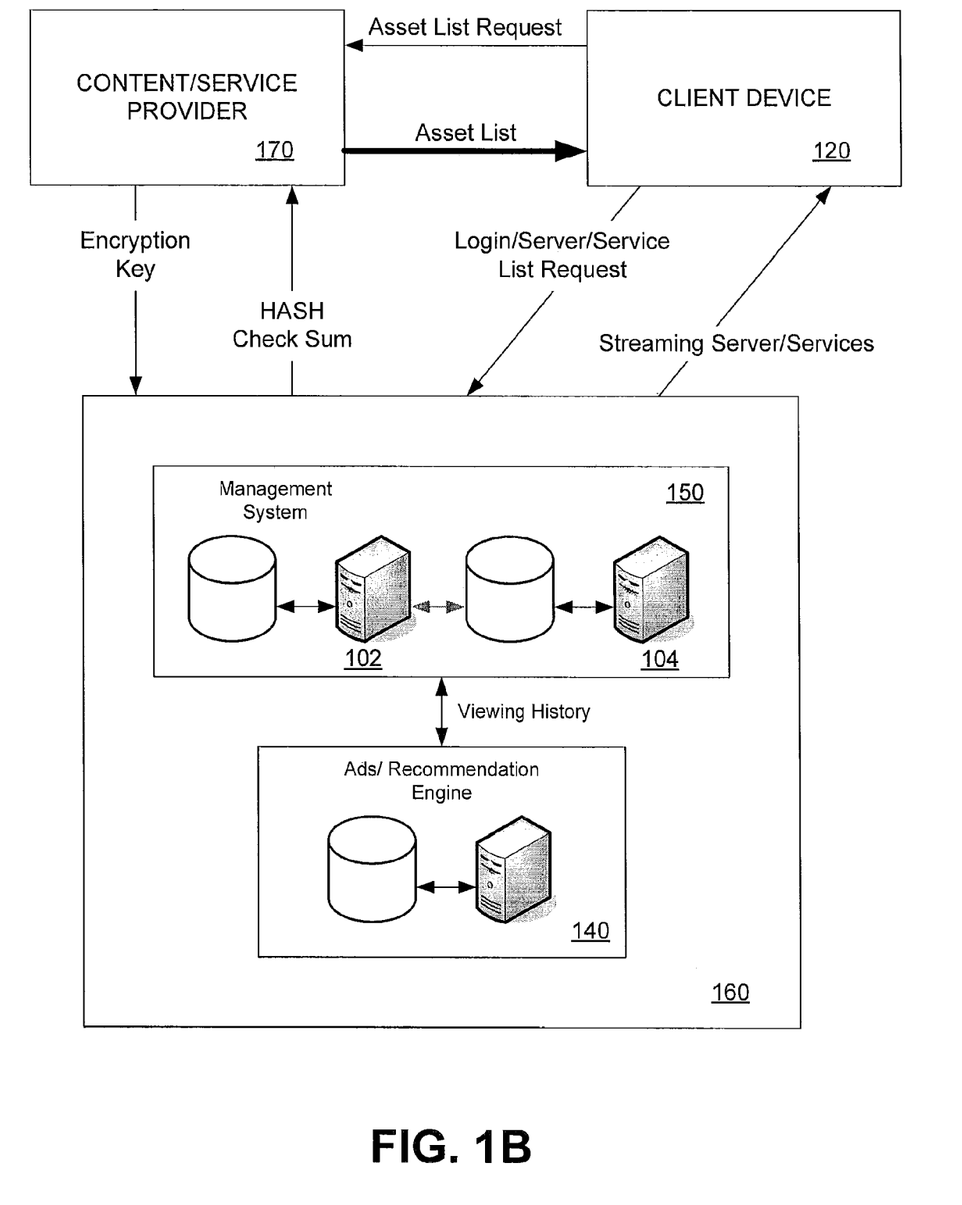
FIG. 1B shows a digital rights management system residing within a server and communicating with a client device in accordance with another implementation of the present invention.

In another implementation illustrated in FIG. 1B, when the client device 120 requests a server list, the digital rights management system 150 checks for a valid certificate from the client device. Once the certificate is validated, the digital rights management system 150 enables the client device 120 to log into and communicate with the server 160 using a secure protocol. In one implementation in which the client device 120 is an IPTV client, the valid certificate further includes at least one of a registered television identifier, a server-specific certificate, a user token, and the use of a secure protocol. Once the client device 120 is authenticated through the use of a valid certificate, an interface unit 104 in the digital rights management system 150 transmits resource identifier(s) that is encrypted. In this implementation, the resource identifier(s) can be encrypted with an encryption key and a hash function including a hash value, which can also be encrypted. For example, the resource identifier(s) is encrypted using an Advanced Encryption Standard (AES) method and Secure Hash Algorithm-256/Secure Hash Algorithm-3 (SHA-256/SHA-3) cryptography on top of it. In this example, the actual hash value is encrypted using a HASH private key. Thus, both the encryption key and the private key are needed to decrypt the resource identifier(s). In other examples, the resource identifier(s) can be encrypted using other hash functions such as Secure Hash Algorithm-1 (SHA-1).

As discussed above, once the client device 120 is authenticated through the use of a valid certificate, the digital rights management system 150 transmits encrypted resource identifier(s) and the two keys, the encryption and the private key. The HASH private key is used to obtain the actual HASH value and the encryption key is used to decrypt the resource identifier(s) to obtain the actual address of the streaming server location. The encryption key can also be used to decrypt the encrypted content. Once the client device 120 decrypts the encrypted content (including playlist), the client device or media player connected to the client device (not shown) can begin the playback of the content.

In the illustrated implementation of FIG. 1B, a task of generating and safeguarding the encryption key and the private key are distributed between a server 160 and a content/service provider 170. That is, the content/service provider 170 generates and updates (or refreshes) its encryption key and transmits the updated encryption key (along with at least one of a service identifier, a date, and a signature) to the server 160. In one implementation, the encryption key is generated and updated according to a schedule. In another implementation, the encryption key is generated and updated manually from time to time. Upon receiving the updated encryption key, the server 160 updates its database, and creates a new HASH check sum value and the private key that are associated with the updated encryption key. This new HASH check sum value is returned to the service provider as successful. The server 160 then uses the updated encryption key and the private key to hash and encrypt the resource identifier(s). It should be noted that since the above-described interactions are all performed within the private relationships established between the client device 120 and the server 160 as well as between the server 160 and the content/service provider 170 using secure protocols, the resource identifier(s) to the streaming contents and services is protected and not exposed to the public.

In one implementation, communication between the content/service provider 170 and the server 160 is performed under a secure protocol including HTTPS using SSL version 3.3 or TLS version 1.2. Further, the interaction protocol between the server 160 and the client device 120 is not limited to HTTP but also includes "I Can Yell" (ICY), ICECAST, Real Time Streaming Protocol (RTSP), Microsoft Media Server (MMS), Microsoft Windows Media HTTP Streaming Protocol (MS-WMSP), Real-time Transport Protocol (RTP), Real Time Messaging Protocol (RTMP), Encrypted Real Time Messaging Protocol (RTMPE), and other similar protocols.

Figure 2A:
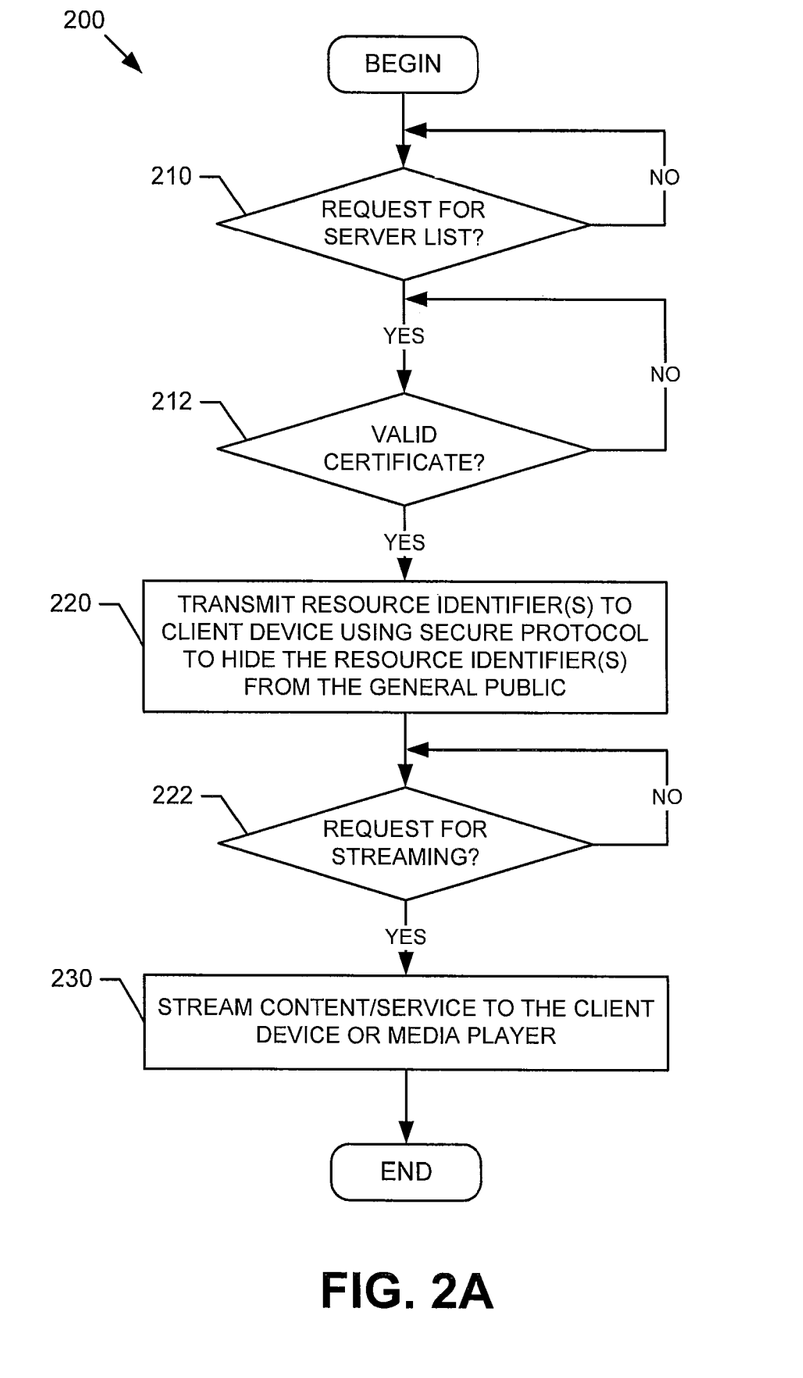
FIG. 2A is a flowchart illustrating a process for managing digital rights of contents and services streamed from servers and service providers to a client device in accordance with one implementation of the present invention.

FIG. 2A is a flowchart illustrating a process 200 for managing digital rights of contents and services streamed from servers and service providers to a client device in accordance with one implementation of the present invention. In the illustrated implementation of FIG. 2A, when a client device 120 requests a server list from the server, at box 210, a check is made, at box 212, to determine whether the client device 120 has presented a valid certificate. Once the certificate is validated, the digital rights management system 100 enables the client device 120 to log into and communicate with the server 110 using a secure protocol. In one implementation in which the client device 120 is an IPTV client, the valid certificate further includes a registered television identifier and/or other server-specific certificates. Thus, the client device 120 already has an existing private relationship with the server 110. Once the client device 120 is authenticated through the use of a valid certificate, resource identifier(s) is transmitted to the client device, at box 220, using a secure protocol to hide the resource identifier(s) from the general public. Since these interactions are performed within secure network(s) using a secure protocol, no information about the resource identifier(s) is exposed to the general public.

Once the client device 120 receives the resource identifier(s), the server 110 or the service provider 130 receives a request or demand, at box 222, from the client device 120 for streaming of the content and/or service referenced by the resource identifier(s). Once the request or demand is received from the client device 120, the content and/or service is streamed, at box 230, for a playback by the client device or media player connected to the client device.

Figure 2B:
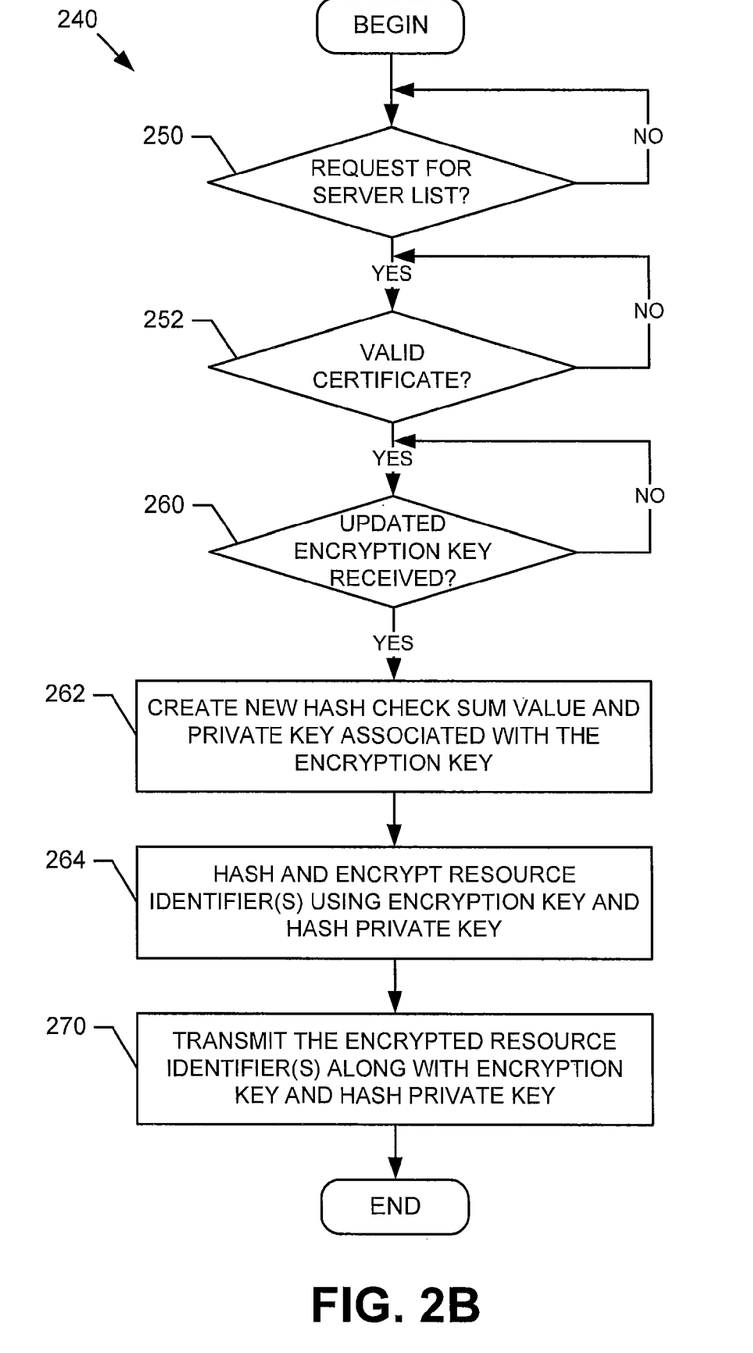
FIG. 2B is a flowchart illustrating a process for managing digital rights of contents and services streamed from servers and service providers to a client device in accordance with another implementation of the present invention.

FIG. 2B is a flowchart illustrating a process 240 for managing digital rights of contents and services streamed from servers and service providers to a client device in accordance with another implementation of the present invention. In illustrated implementation of FIG. 2B, when a client device 120 requests a server list from a server 160, at box 250, a check is made, at box 252, to determine whether the client device 120 has presented a valid certificate. Once the certificate is validated, the digital rights management system 150 enables the client device 120 to log into and communicate with the server 160 using a secure protocol. In one implementation in which the client device 120 is an IPTV client, the valid certificate further includes at least one of a registered television identifier, a server-specific certificate, a user token, and the use of a secure protocol.

Once the client device 120 is authenticated through the use of a valid certificate, encrypted resource identifier(s) is transmitted to the client device using a secure protocol. In this implementation, the resource identifier(s) can be encrypted with an encryption key and a hash function including a hash value, which can also be encrypted. In this example, the actual hash value is encrypted using a HASH private key. Thus, both the encryption key and the private key are needed to decrypt the resource identifier(s).

As discussed above, the HASH private key is used to obtain the actual HASH value and the encryption key is used to decrypt the resource identifier(s) to obtain the actual address of the streaming server location. The encryption key can also be used to decrypt the encrypted content. Once the client device 120 decrypts the encrypted content (playlist), the client device or media player connected to the client device (not shown) can begin the playback of the content.

A task of generating and safeguarding the encryption key and the private key are distributed between a server 160 and a content/service provider 170. That is, the content/service provider 170 generates and updates its encryption key by transmitting an updated encryption key to the server 160. Upon receiving the updated encryption key, at box 260, the server 160 updates its database, and creates a new HASH check sum value and the private key that are associated with the updated encryption key, at box 262. This new HASH check sum value is returned to the service provider 170 as successful. The server 160 then uses the updated encryption key and the private key to hash and encrypt the resource identifier(s), at box 264. Finally, the encrypted resource identifier is transmitted to the client device 120 along with the two keys, at box 270.

Figure 3A:
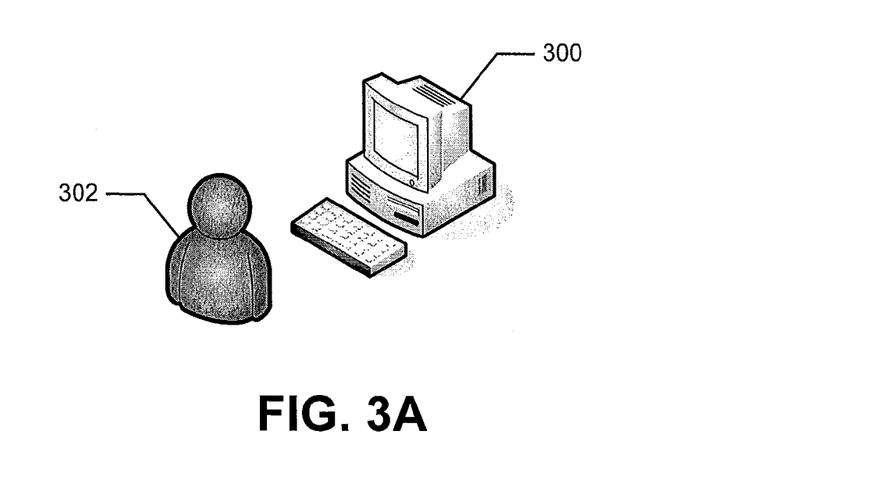
FIG. 3A illustrates a representation of a computer system and a user.

FIG. 3A illustrates a representation of a computer system 300 and a user 302. The user 302 uses the computer system 300 to manage digital rights of streaming contents and services. The computer system 300 stores and executes a digital rights manager 390.

Figure 3B:
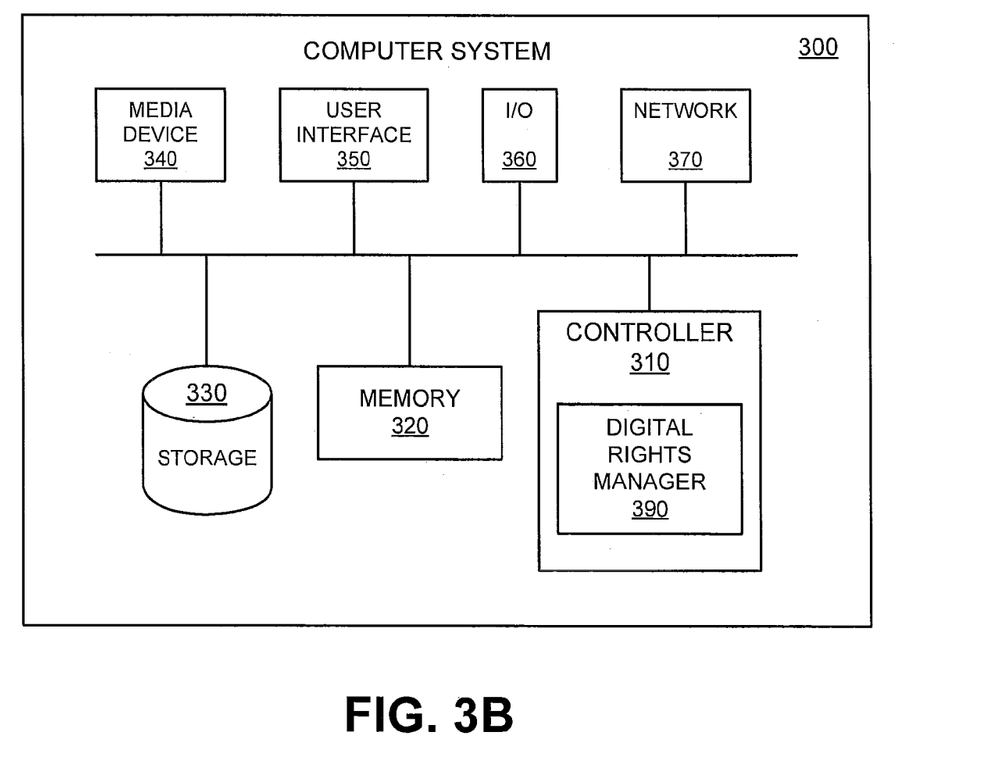
FIG. 3B is a functional block diagram illustrating the computer system hosting a digital rights manager.

FIG. 3B is a functional block diagram illustrating the computer system 300 hosting the digital rights manager 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the digital rights manager 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data temporarily or long term for use by other components of the computer system 300, such as for storing data used by the digital rights manager 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user. In one implementation, the user interface 350 includes a keyboard, a mouse, audio speakers, and a display. The controller 310 uses input from the user to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the implementations discussed above focus on streaming or on-demand contents and services, but digital rights of contents and services that are non-streaming can also be managed. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of managing digital rights of contents and services streamed to a client device, the method comprising:
   authenticating the client device by a server;
   enabling the client device to log into and communicate with the server using a secure protocol when the client device is authenticated by the server;
   receiving an encryption key from a service provider and generating a hash value and a private key associated with the encryption key;
   encrypting a resource identifier using the encryption key and the hash value;
   transmitting the encrypted resource identifier, the encryption key, and the private key to the client device using the secure protocol.

2. The method of claim 1, wherein the resource identifier is an expirable resource identifier including an expiration date.

3. The method of claim 2, wherein the expirable resource identifier expires after the expiration date.

4. The method of claim 2, wherein the expirable resource identifier becomes invalid after a configurable period of time.

5. The method of claim 1, wherein the resource identifier identifies resources including servers, services, and contents.

6. The method of claim 1, further comprising:
   receiving an updated encryption key from the service provider and generating an updated hash value and an updated private key associated with the updated encryption key; and
   hashing and encrypting the resource identifier using the updated encryption key and the updated private key.

7. A digital rights management system for streaming contents and services to a client device, the system comprising:
   a server;
   a registration unit configured to authenticate the client device and to enable the client device to log into and communicate with the server using a secure protocol when authentication of the client device is completed,
   wherein the authentication of the client device is based on an existing client-server relationship between the client device and the server; and
   an interface unit configured to: (1) receive an encryption key from a service provider and generating a hash value and a private key associated with the encryption key; (2) encrypt a resource identifier using the encryption key and the hash value; and (3) transmit the encrypted resource identifier, the encryption key, and the private key to the client device using the secure protocol.

8. The system of claim 7, wherein the existing client-server relationship is used to periodically refresh the resource identifier to prevent unauthorized access to the contents and services.

9. The system of claim 7, wherein the contents and services identified by the resource identifier are streamed to the client device located in at least one of home, concert venue, sporting event, movie, and conference.

10. The system of claim 7, wherein the registration unit is further configured to authenticate the client device when the client device presents a valid certificate to the server, wherein the valid certificate from the client device comprises
   at least one of a registered television identifier, a server-specific certificate, a user token, and a secure protocol.

11. The system of claim 7, wherein the resource identifier includes a Uniform Resource Identifier (URI).

12. The system of claim 7, wherein the resource identifier includes a Uniform Resource Locator (URL).

13. The system of claim 7, wherein the client device includes an Internet Protocol television (IPTV).

14. The system of claim 7, wherein the server is configured as a video streaming service.

15. The system of claim 7, wherein the server is configured as a video on-demand service.

16. A non-transitory computer storage medium storing a computer program to manage digital rights of contents and services streamed to a client device, the computer program comprising executable instructions that cause a computer to:
   authenticate the client device by a server;
   enable the client device to log into and communicate with the server using a secure protocol when the client device is authenticated by the server;
   receive an encryption key from a service provider and generate a hash value and a private key associated with the encryption key;
   encrypt a resource identifier using the encryption key and the hash value;
   transmit the encrypted resource identifier, the encryption key, and the private key to the client device using the secure protocol.

17. The non-transitory computer storage medium of claim 16, further comprising executable instructions that cause the computer to:

receive a request from the client device for streaming of the contents and services referenced by the resource identifier; and stream the contents and services stored in a location identified by the resource identifier.

18. The non-transitory computer storage medium of claim 16, wherein the resource identifier is an expirable resource identifier including an expiration date.

19. The non-transitory computer storage medium of claim 18, further comprising executable instructions that cause the computer to invalidate the expirable resource identifier after the expiration date.

20. The non-transitory computer storage medium of claim 16, further comprising executable instructions that cause the computer to:

receive an updated encryption key from the service provider and generate an updated hash value and an updated private key associated with the updated encryption key; and hash and encrypt the resource identifier using the updated encryption key and the updated private key.

* * * * *